July 12, 1966   V. C. CAMPBELL ET AL   3,260,798
OUTPUT WINDOW ARRANGEMENT FOR A LIGHT VALVE PROJECTOR
Filed Oct. 25, 1963   2 Sheets-Sheet 2
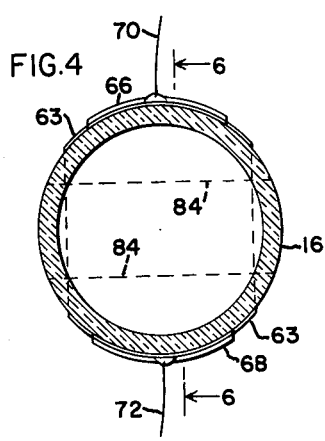
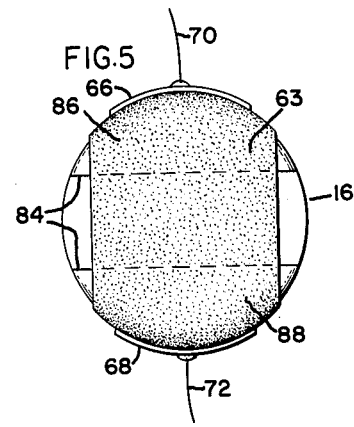
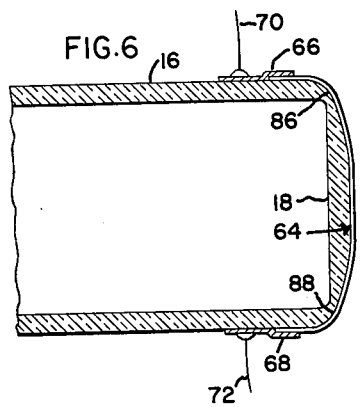
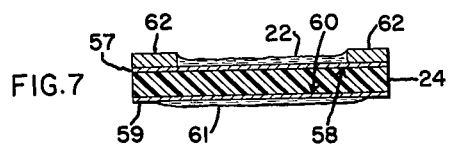
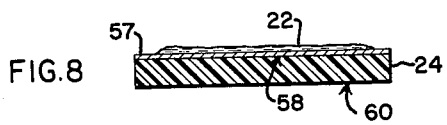
INVENTORS:
VON C. CAMPBELL,
CARLYLE S. HERRICK,
HAROLD A. HORNBECK,
BY *Frank J. Thompson*
THEIR ATTORNEY.

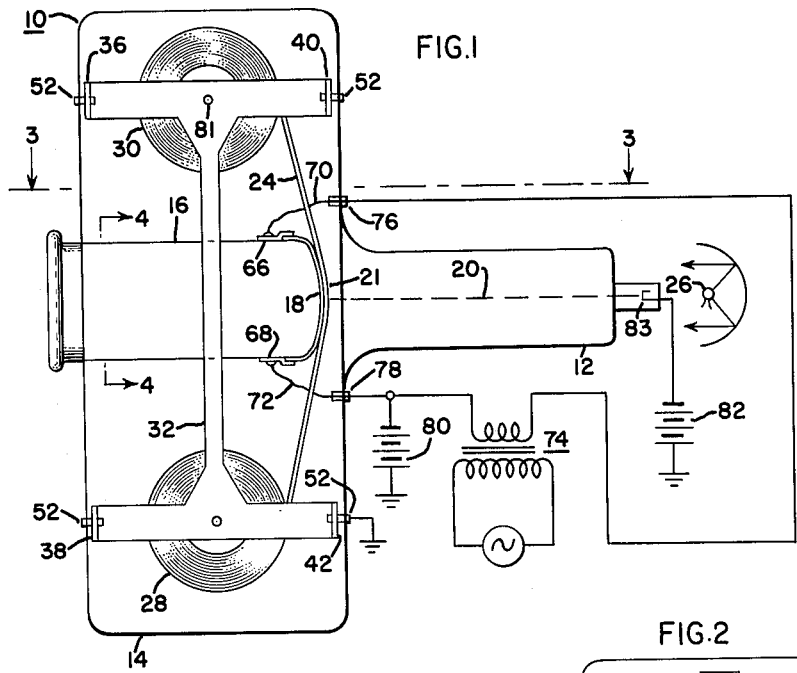
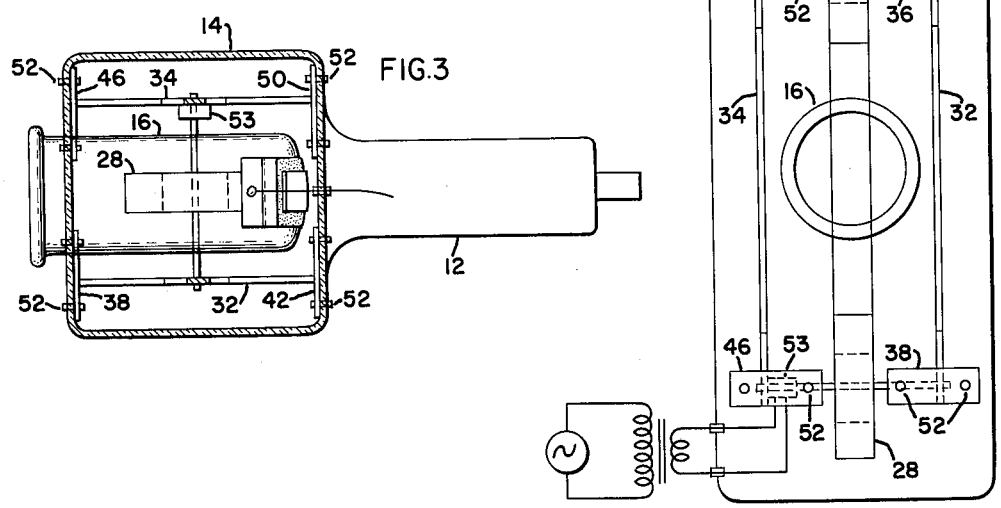
INVENTORS:
VON C. CAMPBELL,
CARLYLE S. HERRICK,
HAROLD A. HORNBECK,
BY *Frank J. Thompson*
THEIR ATTORNEY.

United States Patent Office 3,260,798
Patented July 12, 1966

3,260,798
OUTPUT WINDOW ARRANGEMENT FOR A LIGHT
VALVE PROJECTOR
Von C. Campbell, Syracuse, Carlyle S. Herrick, Alplaus, and Harold A. Hornbeck, Scotia, N.Y., assignors to General Electric Company, a corporation of New York
Filed Oct. 25, 1963, Ser. No. 318,932
6 Claims. (Cl. 178—7.87)

This invention relates to a light valve projection apparatus of the type having a deformable medium which is bombarded by an electron beam in order to form diffraction gratings in the medium. The invention relates more particularly to an improvement in an arrangement for replenishing the deformable medium.

In a known light valve projection apparatus, an electron beam is scanned across the surface of a deformable medium and modulated to form diffraction gratings in the surface of the medium. A Schlieren optical system and a light source are provided and light rays from the source are projected upon the surface of the deformable medium and thence onto a viewing screen where an image representative of the modulating intelligence is reproduced.

After repeated bombardment by the electron beam, presently known deformable mediums exhibit irradiation damage which is characterized by irregularities such as gelations and by other chemical modifications in the body of the medium. These irregularities interfere with the faithful reproduction of an image. By continuously replenishing the medium in the area of electron impingement, this adverse effect can be reduced.

A proposed arrangement for replenishing the medium utilizes a strip of transparent tape having a transparent deformable medium coated on a surface thereof. The tape is mounted within an evacuated envelope of an electron discharge device and is adapted to be transported across an inner surface of an output window of the device. As the tape is drawn past the output window, a scanning electron beam impinges and forms diffraction gratings in the surface of the medium at a position on the tape opposite the output window surface. The medium is thus continuously replenished in the area of beam impingement.

The amplitudes of the gratings are dependent in large measure upon the viscosity of the medium as well as upon the image intelligence contained in the modulated beam. In the area of beam impingement, the medium desirably has the consistency of a liquid. However, storage of the tape prior to use is facilitated when the medium is of a relatively higher viscosity at room temperature. These contrary requirements can be satisfied by providing means for controlling the viscosity of the medium at the area of electron beam impingement. Other advantages accruing from viscosity control include the correction of viscosity variations occurring along the width of the tape and the smoothing of the medium prior to beam impingement.

Accordingly, it is an object of the present invention to provide a means for controlling the viscosity of the deformable medium in the area of electron beam impingement.

Another object of the invention is to provide an output window adapted to control the viscosity of the deformable medium.

Another object of this invention is to provide an output window adapted to control the viscosity of the deformable medium yet which avoids interfering with the optical transmission through the medium, the tape, and the window.

A further object of the present invention is to provide an output window adapted to heat the deformable medium.

In the described tape transport arrangement for replenishing the medium, the medium is coated on that surface of the tape facing the source of electrons. An uncoated surface of the tape facing the output window and a surface of the output window form an interface which causes optical interference and which can adversely affect optical transmission. For reducing the effect of this interface, it is desirable to introduce the deformable medium between these surfaces by coating both surfaces of the tape.

In order to provide parallel light ray transmission through the output window, a surface of the window directly opposite the area of beam impingement is made planar. When sequential segments of the double coated tape are drawn along the window surface, a slight turbulence occurs in the body of the medium resulting from a scraping of the medium by an edge of the planar segment. Voids are thereby created in the body of the medium and these voids impair optical transmission through the medium. Furthermore, the scraping at times causes non-uniform distribution of the medium across the width of the tape which also contributes to the impairment of optical transmission.

It is another object of the present invention to provide an output window arrangement which is shaped in a manner for inhibiting the scraping of the medium.

For avoiding interferences and to enhance the aforementioned heating of the deformable medium, it is further desirable for the moving tape to be maintained in relatively close proximity with the window surface. Arrangements wherein the tape transport mechanism and the output window are relatively positioned in a manner for causing the tape to bear against the window surface are unsatisfactory in that the pressure between tape and window cannot be controlled with the necessary degree of accuracy in an uncomplex and inexpensive manner. A loosely held tape will create interferences while a tape bearing tightly upon the window surface will generally be subjected to surface damage.

Utilization of a double coated tape does provide a force of attraction between the tape and window by virtue of a capillary affect. However, as indicated hereinbefore, this arrangement at times is subject to interferences. Provision for an increased force between the window and tape would enable the tape to bear on the medium and contribute to increased optical contact.

It is thus a further object of the invention to provide a relatively inexpensive and uncomplex arrangement for maintaining the tape in relatively close proximity with the window surface.

Another object of this invention is to provide an arrangement for exerting a force between the surface of the tape and the output window.

Another object of this invention is to provide an output window adapted to cause a single coated tape to bear along the window surface while avoiding surface damage to the tape.

Still another object of this invention is to provide an output window adapted to increase the force exerted between the surfaces of a double coated tape and the output window.

Another object of this invention is to provide an output window arrangement adapted to simultaneously heat the writing medium and to exert an attractive force between the tape and the output window surfaces.

In accordance with the present invention, an electron discharge device for a light valve projection apparatus includes an output window having an inner surface across which a transparent medium is transported by a tape. A conductive transparent film is deposited upon the inner surface of the window. The film is comprised of a material having a resistivity selected to dissipate electrical energy and to become heated when an electric potential is applied to the film. Thus, the window arrangement provides a relatively simple and inexpensive means for heating the medium to a temperature corresponding to a desired viscosity.

Another feature of the invention provides for the application of a direct current potential between the conductive film which is deposited upon the window and the tape. The potential is polarized for causing an electrostatic force of attraction to exist between the window and the tape.

In accordance with a further feature of the invention, the output window surface includes a planar segment opposite the area of beam impingement upon the tape. The window surface is shaped in a manner for providing that other segments of the window across which the tape is drawn merge smoothly with the planar segment at a boundary of the planar segment. An edge is thus eliminated and scraping of the medium is avoided.

Further objects, features, and the attending advantages of the invention will be apparent with reference to the following specification and drawings in which:

FIGURE 1 is a side view of an electron discharge device illustrating an embodiment of the present invention, FIGURE 2 is a front elevation view of the discharge device of FIGURE 1, FIGURE 3 is a view taken along line 3—3 of FIGURE 1, FIGURE 4 is a view taken along line 4—4 of FIGure 1 and illustrates a segment of the envelope of the device which supports an output window for the device, FIGURE 5 is a rear view of the segment of FIGURE 4, FIGURE 6 is a sectional view of the segment of FIGURE 4 which is taken along line 6—6 of FIGURE 4, FIGURE 7 is a cross sectional view of a transparent double coated tape which is utilized with the device of FIGURE 1, and FIGURE 8 is a cross sectional view of a transparent single coated tape which can also be utilized with the device of FIGURE 1.

Reference is now made to FIGURES 1, 2 and 3 for a general description of an electron discharge device 10 for use in a light valve projection apparatus. An evacuated envelope for the device is formed from glass. The envelope has the general shape of a mallet and includes a handle section 12 wherein an electron beam is generated and deflected and a maul section 14 wherein diffraction gratings are formed upon a transported medium. A segment 16 of a glass wall of the section 14 forms a cup shaped reentrant cavity in the section. A closure member 18 at one end of the cavity comprises an output projection window which is described in greater detail hereinafter. Means, not shown, and which may be conventional, are positioned in the section 12 for generating and focusing an electron beam 20 and causing the beam to scan across an area 21 adjacent to the output window 18. Means, not shown, which may be conventional, are also provided for modulating the velocity or intensity of the beam in accordance with image intelligence which is to be reproduced.

A deformable medium 22 is coated upon a transport tape 24, best seen in FIGURES 7 and 8, and is transported past the output window. The scanning electron beam 20 impinges the medium 22 at that point 21 on the tape 24 which is directly opposite the output window 18 to form gratings in the medium. These gratings in cooperation with light rays which are projected upon the surface of the medium from a light source 26 and along with a Schlieren optical system, not shown, function to project an image, which is representative of the beam modulating intelligence, upon a viewing screen located external to the device 10. The use of diffraction gratings in a light valve projection system is known.

For a more detailed description of the operation of a light valve projection apparatus, reference is made to United States Patent No. 2,813,146 which is assigned to the assignee of the present invention.

As indicated hereinbefore, the deformable medium is replenished in order to reduce the affects of irradiation damage. In replenishing the medium, a tape transport arrangement is utilized including tape reels 28 and 30 which are rotatably mounted upon support brackets 32 and 34 respectively. The brackets 32 are welded to four plates 36 through 42 while bracket 34 is similarly welded to four plates, only three of which are shown in the figures and identified as 44, 46, and 50. Rivets 52 are vacuum sealed to the glass wall of section 14 and secure the plates 36–50 to the glass wall. An electric motor 53 is mounted to the bracket 34 and is mechanically coupled to a drive shaft of reel 28 for rotating the reel and drawing the strip of tape 24 past the output window 18. Electrical energy is coupled to the motor from a source 54 via a transformer and feed-through electrical terminals 55 which are vacuum sealed to the glass wall of section 14.

In FIGURES 7 and 8 the arrangements of the double and single coated transparent tapes respectively are shown in detail. Similar reference numerals are utilized in FIGURES 7 and 8 for identifying similar components. The tape 24 comprises a transparent plastic material such as polyethylene glycol terephthalate and which is known commercially as Cronar. A transparent conductive film 57 is deposited on a surface 58 of the tape. The film 57 may comprise a deposited indium oxide. In FIGURE 7, edges 62 are supported upon the film 57. Since these edges will be located out of the area of beam impingement, they may comprise any suitable and economic material such as strips of well known plastic cellulose acetate tape known commercially as Scotch Tape. The medium is coated upon the film 57 between the edges 62. For the double coated arrangement of FIGURE 7, a second film 59 is deposited upon the surface 60 while deformable medium 61 is coated upon film 59. The film 59 may similarly be formed of a deposited indium oxide. The mediums 22 and 61 are of the same material which may comprise a methyl silicone fluid. The double coated tape arrangement of FIGURE 7 and the advantages accruing therefrom are described more fully and claimed in copending application Serial No. 318,946, filed October 25, 1963, and which is assigned to the assignee of the present invention.

In accordance with a feature of the present invention, the output window 18 is adapted to control the viscosity of the medium 22 in the area of electron beam impingement. Referring to FIGURES 4, 5 and 6a, a thin transparent and conductive film 63 is deposited upon an inner surface 64 of the window 18. The term inner surface refers to that surface 64 which is exposed to the low pressure atmosphere within the evacuated section 14. The film 63, although conductive, is selected to have a resistivity which provides a resistive impedance, will dissipate electrical energy, and become heated when an electrical potential is coupled to a pair of electrodes of the film. One suitable material for fabricating film 63 comprises a deposited film of indium oxide. The film is deposited by conventional means. Because a heating current will flow in the film 63, an undesirable electrolytic action may occur at a contact surface for the electrodes for the film 63. To avoid this effect, silver electrodes 66 and 68 are painted on the wall of glass segment 16 and on the film 63. Electrical connections may be made to the electrodes 66 and 68 by soldering leads 70 and 72 thereto.

As indicated in FIGURE 1, a voltage is applied to the leads 70, 72 via a step down transformer 74 and feed-through terminals 76 and 78. These feed-through terminals are vacuum sealed to the glass wall of section 14. Although an alternating voltage is shown coupled between terminals 76 and 78, a direct current voltage may equally well be utilized. Furthermore, at times it may be desirable to control heater current amplitude and for this purpose conventional means such as an autotransformer or rheostat may be included in the circuit. The tape 24 is drawn slowly over the film 63 and thermal energy is exchanged between the medium 22 and the film 63. The exchange of thermal energy occurs by conduction through the medium 61, film 59, tape 24, and film 57 for the double coated tape of FIGURE 7 and by conduction through the tape 24 and the film 57 for the single coated tape. In addition to providing improved optical contact, the medium 61 electrically insulates the film 63 from the conductive film 59. The transferred heat energy increases the temperature of the medium 22 thereby lowering its viscosity. Thus a relatively simple and inexpensive arrangement is provided for controlling the viscosity of the deformable medium in the vicinity of electron beam impingement, yet does not interfere with optical transmission through the window.

In accordance with another feature of this invention, a Direct Current potential is applied between the tape 24 and the window 18 for causing the tape to be maintained in proximity with the surface 64 of the window. As illustrated in FIGURE 1, a source of potential 80 is provided and one terminal thereof is coupled to the film 63 via the terminals 76, 78, leads 70, 72 and the electrodes 66, 68. Another terminal of source 80 is coupled to the conductive coating 57 on the tape via a common ground connection, the conductive rivet 52, the support bracket 32 which is formed of conductive material and a conductive axle 81 of reel 30. The tape 24 is secured to the axle 81 at an end segment of the tape and the film 57 is connected electrically to the axle at this point. The source of potential 80 provides a potential of several thousand volts and an electrostatic force of attraction is thereby exerted between the slowly moving tape and the window 18. This force is sufficiently large in magnitude to cause the single coated tape to bear along the film 63 and provide substantially good optical contact without damaging the surface of the tape. The force adds to the capillary force for the double coated tape thereby smoothing the tape and reducing voids in the medium.

An electron beam accelerating potential for the device 10 is provided by a source of potential 82. The potential is applied between a cathode electrode 83 of an electron gun for the device 10 and the film 57 of the tape 24 via the conductive rivet 52 and the conductive path to the film hereinbefore enumerated. This circuit illustrates that the above described means for providing a force between the window and tape can advantageously utilize means already provided for establishing the accelerating potential, i.e. the film 57 and the enumerated conductive path to the film from the rivet 52.

In accordance with still another feature of the present invention, the surface 64 of the output window is adapted for providing parallel light ray transmission through the window while avoiding surface damage to a single coated tape and inhibiting scraping of the medium of a double coated tape. The surface 64 includes a planar segment whose boundary is indicated generally in FIGURES 4 and 5 by the dotted horizontal lines 84. The window surface 64 also includes first and second surface segments 86 and 88 which are formed to merge with the planar segment without creating an edge or ridge at the point of merger. These segments are provided by grinding the glass surface 64 of window 18 to form a flat planar segment as indicated by the lines 84 and by then grinding surfaces 86 and 88 as curved surfaces which are tangential with respect to the planar segment at a line of merger therebetween.

Thus, an output window for an electron discharge device for a light valve projector apparatus has been described which provides control of the viscosity of a tape transported deformable medium at the area of electron beam impingement in a simple and inexpensive manner; which provides an attractive force between the tape and output window; and which provides parallel transmission of light rays through the window yet which avoids surface damage to a single coated tape and inhibits formation of voids in the medium of a double coated tape.

While I have illustrated and described and have pointed out in the annexed claims certain novel features of my invention, it will be understood that various omissions, substitutions, and changes in the forms and details of the system illustrated may be made by those skilled in the art without departing from the sipirit of the invention and the scope of the claims.

What we claim is:

1. In a light valve projection apparatus, an arrangement for controlling the viscosity of a deformable medium comprising: an evacuated electron discharge device having an output window; a film of transparent conductive material deposited upon the surface of the window; means for transporting a strip of tape having a deformable medium supported thereon along the surface of the output window; and means for applying electric potential to said film in a manner for causing a current to flow in and heat said film.

2. In a light valve projection apparatus, an arrangement for controlling the viscosity of a deformable medium comprising: an evacuated electron discharge device having an output window; a film of indium oxide deposited upon a surface of the window; first and second spaced apart electrodes of silver positioned on said film; means for transporting a strip of tape having a deformable medium supported upon a surface thereof along the window surface; and means for applying an electric potential between said electrodes for causing a current to flow in and heat said film.

3. In a light valve projection apparatus, an arrangement for causing a strip of deformable medium transport tape to be maintained in proximity with an output window of the apparatus comprsing: an evacuated electron discharge device having an output window; a film of transparent conductive material deposited upon a surface of the window; a strip of tape having a conductive material supported upon a surface of the tape and a deformable medium supported upon said later conductive material; means for transporting said tape along said output window surface; and means for applying a direct current electric potential between the conductive film which is deposited upon the window surface and the conductive material which is deposited upon said strip of tape, said applied potential polarized in a manner for causing an electrostatic force of attraction to be exterted between said window and said tape.

4. In a light valve projection apparatus, an electron discharge device having an output window, means for transporting a strip of tape having a deformable medium supported thereon along a surface of the output window, said window surface having a planar surface segment and additional first and second surface segments across which the strip of tape is drawn, said first and second segments bordering on and merging with the planar surface segment; said first and second segments having a curved surface shaped to merge with said planar segment and to be tangential therewith at a line of merger therebetween.

5. In a light valve projection apparatus, an improved arrangement for replenishing a deformable medium comprising: an evacuated electron discharge device having an output window; a strip of tape having a conductive material supported upon a surface thereof and a deformable medium supported upon said conductive material; means for transporting said tape along a surface of the output window; said window surface having a planar segment and additional first and second surface segments; said first and second segments bordering on and merging with said planar surface segment; said first and second segments having a curved surface shaped to merge with said planar segment and to be tangential therewith at a line of merger therebetween; a film of transparent conductive material deposited upon the window surface; means for applying an electric potential to said film in a manner for causing a current to flow in and heat said film; and means for applying a direct current electric potential between the conductive material which is supported upon the tape and the film which is deposited upon said window surface; said direct current potential polarized in a manner for causing an electrostatic force of attraction to be exerted between said window and said tape.

6. The apparatus of claim 5 wherein said film which is deposited upon said window surface comprises indium oxide and first and second spaced apart silver electrodes are positioned upon said film.

No references cited.

DAVID G. REDINBAUGH, *Primary Examiner.*

R. L. RICHARDSON, *Assistant Examiner.*